United States Patent [19]

Dufour

[11] Patent Number: 5,053,456

[45] Date of Patent: Oct. 1, 1991

[54] TRANSPARENT POLYBLENDS

[75] Inventor: Daniel L. Dufour, Waterloo, Belgium

[73] Assignee: Monsanto Europe S.A., Brussels, Belgium

[21] Appl. No.: 441,487

[22] Filed: Nov. 27, 1989

[30] Foreign Application Priority Data

Dec. 12, 1988 [GB] United Kingdom ............... 8828992

[51] Int. Cl.$^5$ ...................... C08L 37/00; C08L 51/04
[52] U.S. Cl. ...................................... 525/74; 525/80; 525/83
[58] Field of Search ............................ 525/74, 80, 83

[56] References Cited

U.S. PATENT DOCUMENTS

| | | | |
|---|---|---|---|
| 4,197,376 | 4/1980 | Lee et al. | 525/74 |
| 4,305,869 | 12/1981 | Lee et al. | 525/74 |
| 4,341,695 | 7/1982 | Lee et al. | 525/74 |

Primary Examiner—Jacob Ziegler
Attorney, Agent, or Firm—William J. Farrington

[57] ABSTRACT

The invention relates to a polyblend comprising from 20 to 80% of a polymer A and from 80 to 20% of a polymer B, based on the total weight of polymers A and B in the polyblend, and wherein:

Polymer A is a copolymer of 35 to 65% of methyl methacrylate and 35 to 65% of styrene grafted on butadienestyrene rubber, methyl methacrylate being partially replaceable by an acrylic ester, and either methyl methacrylate or grafting styrene being partially replaceable by acrylonitrile; and Polymer B is a copolymer of from 20 to 60% of a vinylaromatic hydrocarbon monomer, from 20 to 60% of a $C_1$-$C_4$-alkyl acrylate or a $C_1$-$C_4$-alkyl methacrylate ester, and from 12 to 30% of maleic anhydride or maleimide or a N-substituted maleimide or a mixture of such maleic acid derivatives.

The polyblends have heat resistance, transparency and impact strength.

5 Claims, No Drawings

TRANSPARENT POLYBLENDS

This invention relates to polyblends, and particularly to certain new polyblends which present good transparency in combination with high resistance to heat and impact.

In this specification, all parts and percentages are by weight unless otherwise stated, and for convenience, the following abbreviations are used:
ABS: acrylonitrile-butadiene-styrene copolymer
MBS: methyl methacrylate-butadiene-styrene copolymer
MMA: methyl methacrylate Thermoplastic materials which present good resistance to heat and to impact, in combination with good transparency, would be highly desirable materials for various applications in a wide variety of industries.

Styrene-maleic anhydride copolymers have a good heat resistance but a poor resistance to impact. When blended with MBS or ABS or grafted on rubber they lose their transparency. High impact polymethylmethacrylate has a very good transparency but does not have good heat resistance.

K. Doak in PCT W086/01525 discloses a polyblend comprising:

(a) 20 to 95% of a copolymer comprising a rubber grafted with a mixture of a vinylaromatic monomer and an unsaturated dicarboxylic acid anhydride monomer, and (b) 5 to 80% of a copolymer containing 85% or more MMA.

J. P. Kokai 60-120734 (through Chemical Abstracts, 103, 179213s, 1985) describes thermoplastic moulding compositions comprising:

(a) 30% of a butadiene-styrene rubber grafted with MMA and styrene and, (b) 70% of a copolymer prepared from a mixture of MMA, styrene and methacrylic acid, and which before blending with (a) has been heated in vacuum to form cyclic, 6-membered, acid anhydride groups.

There has now been found a new polyblend of a certain composition that has excellent heat resistance whilst retaining good transparency and impact strength when formed into an article.

The polyblend of the invention comprises from 20 to 80% of a polymer A and from 80 to 20% of a polymer B, based on the total weight of polymers A and B in the polyblend, and wherein:

Polymer A is a copolymer of 35% to 65% methyl methacrylate and 35 to 65% of styrene grafted on butadiene-styrene rubber, methyl methacrylate being partially replaceable by an acrylic ester, for example a $C_1$–$C_4$-alkyl-acrylate such as butyl acrylate, and either methyl methacrylate or grafting styrene being partially replaceable by acrylonitrile; and Polymer B is a copolymer of (based on the weight of polymer B) from 20 to 60% of a vinylaromatic hydrocarbon monomer, from 20 to 60% of a $C_1$–$C_4$-alkyl acrylate or $C_1$–$C_4$-alkyl-methacrylate ester, and from 12 to 30% of maleic anhydride or maleimide or an N-substituted maleimide (or a mixture of such imides or a mixture of maleic anhydride and one or more of such maleimide derivatives).

Another polymer such as for example polymethyl methacrylate, can be present as a third component in the blend but this should not amount to more than 15% by weight of the total polyblend, and preferably not more than 5%.

The invention also comprises processes of producing a transparent article by extrusion (such as for example a profile or a film), by injection-moulding or by blow-moulding, in which there is employed a polyblend according to the invention.

Preferably the polyblend contains from 30 to 70% of polymer A and from 70 to 30% of polymer B.

Polymer A is preferably a copolymer of 40 to 60% of methyl methacrylate and 40 to 60% of styrene grafted on butadiene-styrene rubber. Methyl methacrylate can be partially replaced by an acrylic ester for example a $C_1$–$C_4$-alkyl acrylate such as butyl acrylate. The level of rubber in polymer A could be from 25 to 80% but preferably about 50–75%. A small quantity of acrylonitrile can be used as a comonomer for the graft.

Polymer B is preferably a copolymer of from 33 to 50% of a vinylaromatic hydrocarbon monomer and from 20 to 27% maleic anhydride, and from 25 to 55% of a $C_1$–$C_4$-alkyl acrylate or $C_1$–$C_4$-alkyl methacrylate. The vinylaromatic hydrocarbon monomer is preferably styrene, although hydrocarbon derivatives of styrene such as alpha-methylstyrene or vinyltoluene are also useful. Maleic anhydride can be replaced completely or partially by a maleimide monomer. Suitable maleimide monomers include maleimide itself and N-substituted maleimides such as for example N-phenyl maleimide. Mixtures of these imides can also be employed.

The ester monomer is preferably methyl methacrylate; others that can be employed include for example methyl acrylate, ethyl acrylate, ethyl methacrylate and butyl acrylate. Mixtures of such ester monomers can be employed if desired.

Production of polymers A and B can be by conventional techniques, indeed several members of the class polymer A are articles of commerce. Polymer B is of special composition but can be produced by a method similar to those used commercially to produce polystyrene or styrene copolymers such as styrene/acrylonitrile as for instance a continuous mass process or a solvent process.

The components of the polyblend can be blended together by any conventional technique, which would for example normally involve mechanical shear at an elevated temperature, for example in an extruder, a Banbury mixer or a calendering unit.

The polyblends can contain one or more additives, such as antioxidants, fillers, colourants, stabilisers, plasticisers, light stabilisers and so on, such as are conventionally used in engineering polymers, but they should not be such as would reduce the transparency.

The polyblends of the invention are particularly useful for applications requiring heat resistance and some impact properties, for example, electrical box covers, instrument covers, electrical appliance parts, automotive parts packaging, medical connectors etc.

The invention is illustrated by the following Examples.

EXAMPLES

In the following Examples, a number of polyblends were prepared and calendered into films, and the Vicat softening point, Izod impact strength and transparency of each film were measured; from these data it was possible to determine which of the polyblends would be usable for producing transparent heat-resistance articles of high impact strength in accordance with the invention. Examples 1 to 4, 7 to 10 and 13 were according to the invention, Examples 5, 6, 11 and 12 were comparative Examples.

Polymer A was in Examples 1 to 13 a commercial methyl methacrylate/butadiene/styrene copolymer rubber impact modifier sold by Röhm and Haas under the trade name "MBS BTA III OR".

A series of different polymers B were used, each consisting of a copolymer of either styrene and maleic anhydride or of styrene, maleic anhydride and methyl methacrylate in the percentage proportions shown in Table 1.

TABLE 1

| Polymer | Styrene | Maleic Anhydride | Methyl Methacrylate |
|---|---|---|---|
| $B_1$ | 75 | 25 | 0 |
| $B_2$ | 69 | 25 | 6 |
| *$B_3$ | 55 | 22 | 23 |
| *$B_4$ | 52 | 22 | 26 |
| *$B_5$ | 46 | 23 | 31 |
| *$B_6$ | 28 | 21 | 51 |

*Polymer used in Examples of the invention.

Each of the polymers B was prepared by continuous mass polymerisation of the constituent monomers.

Each polyblend, Examples 1 to 4 (Table 2) was made by blending polymers A and B in the proportions shown in Table 2. The blending was performed on a Schwabenthan laboratory two-roll mill. A 100 gram sample was processed for a time shown in Table 2 with the back roll at a temperature of 180° C. and rotating at 21 revolutions per minute and the front roll at 190° C. and rotating at 24 revolutions per minute. The sample was calendered into a film 1 mm thick. To make samples for Izod and Vicat measurements several layers of film were compressed at 180° C. into a plaque 3.2 mm thick. To make samples for transparency measurement, one thickness of film was compressed at 180° C. to a thickness of 0.4 mm.

Each polyblend also included the following additions:

0.2 phr (parts per hundred parts of resin) of PE 316A (oxidised polyethylene wax) supplied by Allied Chemical.

0.5 phr Irganox ® 1076 antioxidant supplied by Ciba-Geigy.

2.0 phr Syncrolube ® 3320 (glycerintriester) lubricant supplied by Croda.

®: Trade Mark.

The Vicat softening point, Izod impact strength and transparency are also reported in Table 2. Transparency was measured as the average % transmission of light through the sample, using a UV/visible-light spectrophotometer at ten specific wavelengths corresponding to the maximum intensity in the visible-light range of the solar radiation spectrum. The ten wavelengths were: 489.4 nm, 515.1 nm, 529.8 nm, 541.4 nm, 551.8 nm, 561.9 nm, 572.5 nm, 584.8 nm, 600.8 nm and 627.2 nm.

TABLE 2

| | Example No. | | | |
|---|---|---|---|---|
| | 1 | 2 | 3 | 4 |
| Polymer A | 30 | 40 | 50 | 60 |
| Polymer $B_4$ | 70 | 60 | 50 | 40 |
| Mixing time min | 5 | 5 | 4.5 | 4.5 |
| % Light Transmission | 44 | NA | 76 | 81 |
| Vicat (1 Kg) °C. | 142 | 141 | 140 | 135 |
| (5 kg) °C. | 123 | 123 | 103 | 88 |
| Notched Izod impact J/m | 30 | 52 | 98 | 141 |

NA: not available.

All the Examples 1 to 4 have 1 kg Vicat softening point above 125° C. and notched Izod impact above 30 J/m. The light transmission on 0.4 mm film is superior to 40%. Transparency can be improved by using a different Polymer A or by better mixing.

EXAMPLES 5 TO 11

Another series of polyblends were prepared and tested in a similar manner, and the results are shown in Table 3: These differed from Examples 1 to 9 in having been prepared on a Troerter calendering unit at a roll temperature 180°-190° C. The minor additives were the same as in Examples 1 to 4.

TABLE 3

| | Example No. | | | | | | |
|---|---|---|---|---|---|---|---|
| | 5 Control | 6 Control | 7 | 8 | 9 | 10 | 11 Control |
| Polymer A | 30 | 30 | 30 | 30 | 30 | 30 | 30 |
| Polymer $B_1$ | 70 | | | | | | |
| Polymer $B_2$ | | 70 | | | | | |
| Polymer $B_3$ | | | 70 | | | | |
| Polymer $B_4$ | | | | 70 | | | |
| Polymer $B_5$ | | | | | 70 | | |
| Polymer $B_6$ | | | | | | 70 | |
| *HT 120 | | | | | | | 70 |
| PE 316A | 0.2 | | | | | | |
| Irganox 1076 | 0.5 | | | | | | |
| Syncrolube 3320 | 2 | | | | | | |
| mixing time min. | 8 | 9 | 6 | 7 | 5.5 | 5 | 7 |
| % Transmission at 0.4 mm | 26 | 31 | 55 | 60 | 70 | 78 | 59 |
| Vicat 1 Kg °C. | 146 | 144 | 135 | 141 | 132 | 126 | 113 |
| Vicat 5 Kg °C. | 126 | 125 | 118 | 122 | 115 | 109 | 92 |
| notched Izod Impact J/M | 52 | 38 | 66 | 43 | 36 | 48 | 49 |

*HT 120: is a modified polymethylmethacrylate from Degussa.

In this set of experiments on a different machine the mixing time was increased to have better dispersion of the two components versus the first set of experiments. The impact and transmission of sample 8 are better than sample 1.

EXAMPLES 12 AND 13

Two more examples were carried out as shown in Table 4.

TABLE 4

| | Example No. | |
|---|---|---|
| | 12 Control | 13 |
| Polymer A | 50 | 50 |
| Polymer B$_2$ | 50 | |
| Polymer B$_5$ | | 50 |
| PE 316A | 0.2 | 0.2 |
| Irganox ® 1076 | 0.5 | 0.5 |
| Syncrolube ® 3320 | 2 | 2 |
| Equipment laboratory banbury 4 liters | | |
| charge 3.2 Kg | | |
| mixing time 2.5 min | | |
| maximum temperature 220° C. | | |
| Samples injection moulded for testing | | |
| % Transmission | 1 | 33 |
| (2.5 mm thick sample) | | |
| Vicat 1 Kg °C. | 143 | 132 |
| 5 Kg °C. | 108 | 100 |
| Notched Izod impact J/m | 43 | 30 |

®: Trade mark

I claim:

1. A polyblend comprising from 30 to 70% by weight of a Polymer A and from 70 to 30% by weight of a Polymer B, based on the total weight of Polymers A and B in the polyblend; wherein Polymer A is a copolymer of 40% to 60% by weight of methyl methacrylate and 40 to 60% by weight of styrene grafted on a butadiene-styrene rubber based on the total weight of Polymer A; and Polymer B is a copolymer of from 35 to 50% by weight of a vinylaromatic monomer selected from the group consisting of styrene, alpha methyl styrene and vinyl toluene; from 25 to 55% by weight of a $C_1$-$C_4$-alkyl acrylate or a $C_1$-$C_4$-alkyl methacrylate ester, and from 20 to 27% by weight of maleic anhydride based on the weight of Polymer B; wherein the polyblend is characterized by having a 1 kg Vicat softening point above 125° C.; a notched Izod impact above 30 J/m and a light transmission as measured on a 0.4 mm film greater than 40%.

2. A polyblend as in claim 1 wherein the level of rubber in Polymer A is from 25 to 80% by weight.

3. A polyblend as in claim 1 wherein the vinylaromatic monomer in Polymer B is selected from the group consisting of styrene and alpha-methylstyrene.

4. A polyblend as in claim 1 wherein the ester used in Polymer B is methyl methacrylate.

5. A polyblend as in claim 1 wherein Polymer B is a copolymer of styrene, maleic anhydride and methyl methacrylate.

* * * * *